United States Patent
Rusignuolo et al.

(10) Patent No.: US 9,464,839 B2
(45) Date of Patent: Oct. 11, 2016

(54) SEMI-ELECTRIC MOBILE REFRIGERATED SYSTEM

(75) Inventors: Giorgio Rusignuolo, Manlius, NY (US); Nader S. Awwad, Baldwinsville, NY (US); Bruce E. Sing, Carmel, IN (US); Robert A. Chopko, Baldwinsville, NY (US); John R. Reason, Liverpool, NY (US)

(73) Assignee: CARRIER CORPORATION, Farmington, CT (US)

( * ) Notice: Subject to any disclaimer, the term of this patent is extended or adjusted under 35 U.S.C. 154(b) by 144 days.

(21) Appl. No.: 14/009,641

(22) PCT Filed: Mar. 26, 2012

(86) PCT No.: PCT/US2012/030537
§ 371 (c)(1),
(2), (4) Date: Oct. 3, 2013

(87) PCT Pub. No.: WO2012/138497
PCT Pub. Date: Oct. 11, 2012

(65) Prior Publication Data
US 2014/0020414 A1    Jan. 23, 2014

Related U.S. Application Data

(60) Provisional application No. 61/471,470, filed on Apr. 4, 2011.

(51) Int. Cl.
*B60P 3/20* (2006.01)
*F25D 11/00* (2006.01)
(Continued)

(52) U.S. Cl.
CPC ......... *F25D 11/003* (2013.01); *B60H 1/00364* (2013.01); *B60H 1/00428* (2013.01); *B60H 1/00828* (2013.01); *B60H 1/3226* (2013.01); *B60H 1/3232* (2013.01); *B60P 3/20* (2013.01)

(58) Field of Classification Search
CPC ............ F25D 11/003; B60H 1/00634; B60H 11/00428; B60H 11/3226; B60H 11/3232; B60P 3/20
See application file for complete search history.

(56) References Cited

U.S. PATENT DOCUMENTS

| 4,257,240 A | 3/1981 | Christiansen et al. |
| 4,348,871 A | 9/1982 | Androff |

(Continued)

FOREIGN PATENT DOCUMENTS

| CN | 86101267 A | 9/1987 |
| CN | 1488061 A | 4/2004 |

(Continued)

OTHER PUBLICATIONS

PCT International Search Report and Written Opinion of the International Searching Authority for International Application No. PCT/US2012/030537, Jun. 28, 2012, 12 pages.

(Continued)

*Primary Examiner* — Jonathan Bradford
(74) *Attorney, Agent, or Firm* — Cantor Colburn LLP (57) ABSTRACT

A power supply system for a transport refrigeration system includes an engine coupled to a compressor of a refrigeration unit for direct drive powering the compressor and a generator arranged to also be direct driven by the engine for generating electric power. The generator and the compressor are mounted to a common drive shaft driven by the engine, and the generator may be integrated with the compressor. The power supply system may further include an alternator arranged to be belt driven by the engine for generating DC electric power. A battery pack may be provided for storing and supplying additional DC power. During peak load demand on the refrigeration unit, the engine may be operated with the generator switched off to directly drive the compressor and direct current may be drawn from the battery pack to drive the condenser/gas cooler and evaporator fans.

12 Claims, 6 Drawing Sheets (51) Int. Cl.
  *B60H 1/00* (2006.01)
  *B60H 1/32* (2006.01)

(56) References Cited

U.S. PATENT DOCUMENTS

| | | | |
|---|---|---|---|
| 4,353,221 A | 10/1982 | Taylor | |
| 4,365,484 A | 12/1982 | Carson et al. | |
| 4,394,818 A | 7/1983 | Brownfield et al. | |
| 4,549,405 A | 10/1985 | Anderson et al. | |
| 4,688,391 A | 8/1987 | Chopko et al. | |
| 4,899,550 A | 2/1990 | Chopko et al. | |
| 5,609,037 A * | 3/1997 | Fischler | 62/239 |
| 5,916,253 A | 6/1999 | Amr et al. | |
| 5,960,637 A | 10/1999 | Stevens et al. | |
| 6,062,030 A | 5/2000 | Viegas | |
| 6,223,546 B1 | 5/2001 | Chopko et al. | |
| 6,321,550 B1 | 11/2001 | Chopko et al. | |
| 6,357,248 B1 | 3/2002 | Bongaards et al. | |
| 6,622,505 B2 | 9/2003 | Anderson et al. | |
| 6,871,629 B2 | 3/2005 | Hanson et al. | |
| 7,080,521 B2 | 7/2006 | Ludwig et al. | |
| 7,260,946 B2 | 8/2007 | Ludwig et al. | |
| 7,266,961 B2 | 9/2007 | Ludwig et al. | |
| 7,458,417 B2 | 12/2008 | Larson | |
| 7,673,466 B2 | 3/2010 | Pacy | |
| 7,874,169 B2 | 1/2011 | Leroy | |
| 7,878,013 B2 | 2/2011 | Matsuno et al. | |
| 7,926,294 B2 | 4/2011 | Tsai et al. | |
| 8,037,704 B2 | 10/2011 | Viegas | |
| 8,295,950 B1 * | 10/2012 | Wordsworth et al. | 700/22 |
| 2002/0026805 A1 | 3/2002 | Takahashi | |
| 2002/0108387 A1 | 8/2002 | Barrett et al. | |
| 2002/0108388 A1 | 8/2002 | Wilson et al. | |
| 2002/0108389 A1 | 8/2002 | Chopko et al. | |
| 2002/0129613 A1 | 9/2002 | Viegas et al. | |
| 2003/0141049 A1 | 7/2003 | Kennedy | |
| 2004/0104578 A1 | 6/2004 | Wurtele | |
| 2006/0248907 A1 | 11/2006 | Allen et al. | |
| 2007/0052241 A1 | 3/2007 | Pacy | |
| 2007/0138006 A1 | 6/2007 | Oakes et al. | |
| 2007/0289325 A1 | 12/2007 | Stone | |
| 2008/0148748 A1 | 6/2008 | Viegas et al. | |
| 2009/0113914 A1 | 5/2009 | Kitano et al. | |
| 2009/0133419 A1 | 5/2009 | Matsuno et al. | |
| 2009/0250190 A1 | 10/2009 | Siegenthaler | |
| 2009/0277195 A1 | 11/2009 | Viegas et al. | |
| 2009/0301702 A1 | 12/2009 | Zeigler et al. | |
| 2010/0077786 A1 | 4/2010 | Siegenthaler et al. | |
| 2010/0089083 A1 | 4/2010 | Awwad et al. | |
| 2010/0107661 A1 | 5/2010 | Awwad et al. | |
| 2010/0154449 A1 | 6/2010 | Stover, Jr. et al. | |
| 2010/0171364 A1 | 7/2010 | Awwad | |
| 2010/0180614 A1 | 7/2010 | Larson et al. | |
| 2010/0263393 A1 | 10/2010 | Chen et al. | |
| 2010/0305794 A1 | 12/2010 | Foster | |
| 2011/0000244 A1 | 1/2011 | Reason et al. | |
| 2011/0011115 A1 | 1/2011 | Bushnell | |
| 2011/0088411 A1 | 4/2011 | Steele et al. | |
| 2011/0114398 A1 | 5/2011 | Bianco | |
| 2011/0126566 A1 | 6/2011 | Jones et al. | |
| 2011/0132006 A1 | 6/2011 | Milton et al. | |
| 2011/0241420 A1 | 10/2011 | Hering et al. | |
| 2011/0247350 A1 | 10/2011 | Awwad et al. | |
| 2011/0301762 A1 | 12/2011 | Walker et al. | |

FOREIGN PATENT DOCUMENTS

| | | |
|---|---|---|
| CN | 101251096 A | 8/2008 |
| CN | 101292126 A | 10/2008 |
| CN | 101583833 A | 11/2009 |
| CN | 101605673 A | 12/2009 |
| CN | 101681177 A | 3/2010 |
| EP | 0978652 A2 | 2/2000 |
| EP | 1046525 A2 | 10/2000 |
| EP | 1454777 A1 | 9/2004 |
| EP | 1935712 A1 | 6/2008 |
| EP | 2174078 A1 | 4/2010 |
| WO | 2008061330 a1 | 5/2008 |
| WO | 2009008859 A1 | 1/2009 |
| WO | 2009017686 A2 | 2/2009 |
| WO | 2010002644 A1 | 1/2010 |
| WO | 2010032074 A1 | 3/2010 |
| WO | 2010074938 A1 | 7/2010 |
| WO | 2011056642 A2 | 5/2011 |

OTHER PUBLICATIONS

PCT International Preliminary Report on Patentability for the International Searching Authority for International Application No. PCT/US2012/030537, Oct. 8, 2013, 6 pages.

Chinese Second Office Action and Search Report for application CN 201280019115.4, Issued Oct. 16, 2015, 5 pages.

\* cited by examiner

SEMI-ELECTRIC MOBILE REFRIGERATED SYSTEM

CROSS-REFERENCE TO RELATED APPLICATION

Reference is made to and this application claims priority from and the benefit of U.S. Provisional Application Ser. No. 61/471,470, filed Apr. 4, 2011, and entitled SEMI-ELECTRIC MOBILE REFRIGERATED SYSTEM, which application is incorporated herein in its entirety by reference.

BACKGROUND OF THE INVENTION

This invention relates generally to mobile refrigerated systems for transport of perishable cargo and, more particularly, to a power supply system for a semi-electric transport refrigeration system and method for operating a semi-electric transport refrigeration system.

Refrigerated trucks and trailers are commonly used to transport perishable cargo, such as, for example, produce, meat, poultry, fish, dairy products, cut flowers, and other fresh or frozen perishable products stored in a refrigerated cargo space, commonly referred to as the cargo box, within the truck or trailer. A transport refrigeration system is mounted to the truck or the trailer for maintaining a controlled temperature environment within the cargo space within the truck or trailer.

Conventionally, transport refrigeration systems used in connection with refrigerated trucks and refrigerated trailers include a transport refrigeration unit having a refrigerant compressor, a condenser coil with one or more associated condenser fans, an expansion device, and an evaporator coil with one or more associated evaporator fans, which are connected via appropriate refrigerant lines in a closed refrigerant flow circuit. Air or an air/gas mixture or other gas is drawn from the interior volume of the trailer by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated trucks and refrigerated trailers, the compressor, and typically other components of the transport refrigeration unit, must be powered during transit by a prime mover. In the case of refrigerated trailers, the prime mover typically comprises a Diesel engine carried on and considered part of the transport refrigeration system. In mechanically driven transport refrigeration systems the compressor is mechanically driven by the Diesel engine, either through a direct mechanical coupling or a belt drive, and other components, such as the condenser and evaporator fans are belt driven.

An all electric transport refrigeration system for refrigerated trailer application is also commercially available through Carrier Corporation headquartered in Farmington, Conn., USA. In the all electric transport refrigeration system, a prime mover, most commonly a Diesel engine, carried on and considered part of the transport refrigeration system, drives an AC synchronous generator that generates AC power. The generated AC power is used to power an electric compressor motor for driving the refrigerant compressor of the transport refrigeration unit and also powering electric AC fan motors for driving the condenser and evaporator motors and electric heaters associated with the evaporator. For example, U.S. Pat. No. 6,223,546 discloses an all electric transport refrigeration system.

In conventional practice, a transport refrigeration unit installed on a refrigerated truck or trailer operates in one of a temperature pull down mode, a temperature maintenance mode, or a standstill mode. In the temperature pull down mode, the refrigerant compressor, the condenser fan(s) and the evaporator fan(s) are operating with the refrigerant compressor generally operating at full capacity to lower the temperature within the cargo space as rapidly as possible to a desired set point temperature appropriate for the particular cargo stowed in the cargo space. In the temperature maintenance mode, the refrigerant compressor, the condenser fan(s) and the evaporator fan(s) are still operating, but the refrigerant compressor is operating at a significantly lower capacity so as to maintain the temperature in the cargo space within a specified range of the desired set point temperature and avoid over cooling. In the temperature maintenance mode, heaters associated with the evaporator may also be activated as necessary to warm the air passed through the evaporators by the evaporator fan(s) to prevent over cooling. In the standstill mode, the refrigerant compressor and the condenser and evaporator fans are off.

Diesel engines used as prime movers on transport refrigeration systems generally have two operating speeds, that is a high RPM speed, such as 2200 RPM, and a low RPM speed, such as 1400 RPM. In operation, the Diesel engine is operated at high speed during temperature pull down and at low speed during the temperature maintenance mode. During standstill, the Diesel engine is typically idling at low speed. The Diesel engine is generally designed to meet the power needs of the transport refrigeration system during operation at maximum capacity, such as during the temperature pull down mode, with efficient fuel consumption.

SUMMARY OF THE INVENTION

A mobile refrigerated system for transport of perishable cargo includes a refrigeration unit having a compressor and a plurality of refrigeration unit electric loads, and a power supply system for powering the compressor and the plurality of electric loads.

In an aspect, the power supply system includes an engine coupled to the compressor for direct drive powering the compressor, and a generator arranged to be direct driven by the engine for generating electric power, the generator and the compressor are mounted to a common drive shaft driven by the engine. The generator may be integrated with the compressor. The power supply system may further include an alternator arranged to be belt driven by the engine for generating electric power. The refrigeration unit may be operatively associated with a refrigerated cargo box, such as a truck, trailer or intermodal container, for controlling a temperature with the cargo box.

The power supply system may further include a power distribution system arranged to receive electric power generated by the generator and by the alternator and configured to selectively distribute electric power to the plurality of refrigeration unit electric loads. The generator generates alternating current power and the alternator generates direct current power and the power distribution system is configured to distribute alternating current power to at least one of the plurality of refrigeration unit electric loads and to distribute direct current power to at least one of the plurality of refrigeration unit electric loads. The power supply system may further include a high voltage battery pack for storing electric power and providing a second source of direct current power. A high voltage battery pack charger electrically coupled to the generator may be provided and configured to charge the high voltage battery pack.

A method is provided for operating a transport refrigeration system having a refrigeration unit having a compressor, a condenser fan and an evaporator fan. In an aspect the method includes the steps of: providing an engine and coupling the engine to the compressor for directly driving the compressor; providing a generator and coupling the generator to the engine for directly driving the generator for generating alternating current power; providing alternating current motors for driving the condenser fan and the evaporator fan; and powering the alternating current motors with alternating current generated by the generator. The method may further include the step of integrating the generator into the compressor.

In another aspect the method includes the steps of: providing an engine and coupling the engine to the compressor for directly driving the compressor; providing a generator and coupling the generator to the engine for directly driving the generator for generating alternating current power; providing a high voltage battery pack for storing and supplying direct current power; providing direct current motors for driving the condenser fan and the evaporator fan; and during a temperature pull down mode, operating the engine to drive the compressor, switching off the generator and powering the direct current motors with direct current supplied by the high voltage battery pack. The method may include the further steps of during a temperature control mode: switching on the generator; operating the engine to drive the compressor and the generator; converting alternating current power generated by the generator to direct current power; and powering the direct current motors with the converted power.

The method may include the further steps of during a standstill mode: shutting down the engine; and operating the evaporator fan at selected intervals for selected time periods using direct current power supplied by the high voltage battery pack. The method may include the further steps of: providing a low voltage battery pack; and during a standstill mode, shutting down the engine and operating the evaporator fan at selected intervals for selected time periods using direct current power supplied by the low voltage battery pack. The method may include the further step of charging the high voltage battery pack using alternating power generated by the generator.

BRIEF DESCRIPTION OF THE DRAWINGS

For a further understanding of the disclosure, reference will be made to the following detailed description of the disclosure which is to be read in connection with the accompanying drawing, where.

DETAILED DESCRIPTION OF THE INVENTION

A mobile refrigerated system for transport of perishable cargo comprises a transport refrigeration system 20. In the exemplary embodiment depicted in FIG. 1, the transport refrigeration system 20 includes a refrigeration unit 22, a power supply system including an electric generator 24 and an engine 26, and a controller 30. The refrigeration unit 22 functions, under the control of the controller 30, to establish and regulate a desired product storage temperature within a refrigerated cargo space of the mobile refrigerated system wherein a perishable product is stored during transport and to maintain the product storage temperature within a specified temperature range. The mobile refrigerated system may be a trailer, a truck, or an intermodal container wherein perishable cargo, such as, for example, produce, meat, poultry, fish, dairy products, cut flowers, and other fresh or frozen perishable products, is stowed for transport in the refrigerated cargo space, commonly referred to as the cargo box, of the truck, trailer or intermodal container.

Figure 1:
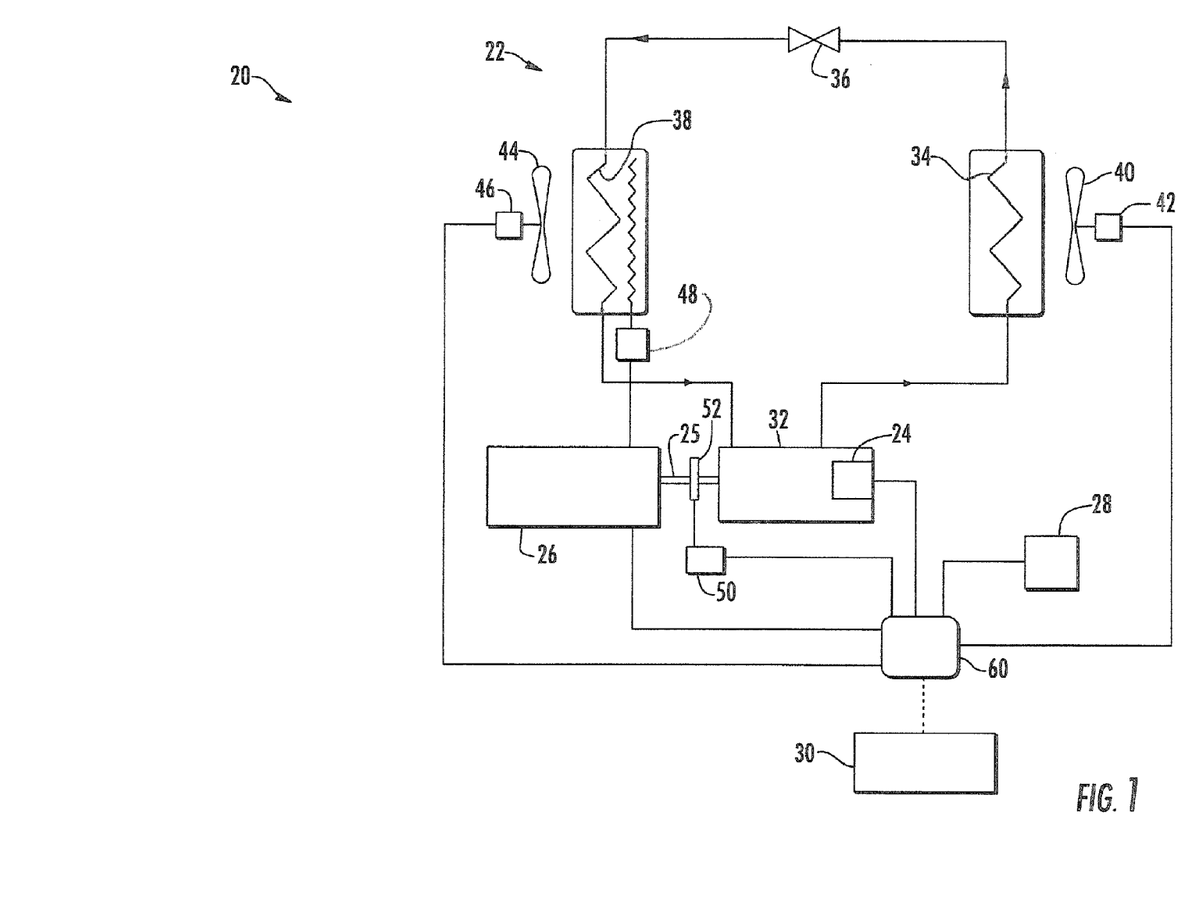
FIG. 1 is a schematic representation of a transport refrigeration system having a refrigeration unit and an associated power supply system as disclosed herein.

The transport refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include an electric resistance heater 48 associated with the refrigerant heat absorption heat exchanger 38. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes extending between respective inlet and outlet manifolds. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending between respective inlet and outlet manifolds. The fan(s) 44 are operative to pass air drawn from the temperature controlled cargo box across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the temperature controlled cargo box. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigeration system 20 also includes a controller 30 configured for controlling operation of the refrigeration system 20 including, but not limited to, operation of various components of the refrigerant unit 22, to provide and maintain a desired thermal environment within the cargo box of the mobile refrigerated system, that is within the temperature controlled space in which a perishable product is stowed. The controller 30 may be an electronic controller including a microprocessor and an associated memory bank. The controller 30 controls operation of various components of the refrigerant unit 22, such as the refrigerant compression device 32 and its associated drive motor 50, the fan motors 42, 46 and the electric heater 48. The controller 30 may also be also to selectively operate the engine 26, typically through an electronic engine controller (not shown) operatively associated with the engine 26.

The refrigerant compression device 32, which may comprise a single-stage or multiple-stage compressor, such as, for example, a reciprocating compressor, is directly driven by the engine 26, which comprises an on-board fossil-fuel engine, most commonly a Diesel engine. The compression device 32 has a compression mechanism (not shown) directly coupled to a drive shaft 25 of the engine 26. For example, the compression mechanism of the compression device 32 may be mechanically mounted to the engine drive shaft 25 or mounted to a shaft mechanically coupled in a direct drive relationship to the engine drive shaft 25.

The engine 26 also drives the electric generator 24 for generating alternating current (AC) electrical power. The electric generator 24 may, for example, comprise a synchronous AC generator or a permanent magnet AC generator. The electric generator 24 may be integrated with the compression device 32 into a unit mounted to and directly driven by the engine 26. For example, referring now to FIG. 2, the compression device 32 may comprise an open drive reciprocating compressor having a compression mechanism mounted on the drive draft of the engine 26 and the electric generator 24 may be mounted on a distal end of the engine drive shaft outboard of the compression mechanism of the compression device 32, but integrated within the housing of the compression device 32. In this manner, both the compression mechanism of the compression device 32 and the electric generator 24 are housed as a single unit and commonly direct driven by the engine 26.

The refrigeration unit 22 has a plurality power demand loads, including, but not limited to, the drive motor(s) 42 for the fan(s) 40 associated with the refrigerant heat rejection heat exchanger 34 and the drive motor(s) 46 for the fan(s) 44 associated with the refrigerant heat absorption heat exchanger 38. In the depicted embodiment, an electric resistance heater 48 is provided that also constitutes a power demand load. The electric resistance heater may be selectively operated by the controller 30 whenever a control temperature within the temperature controlled cargo box drops below a preset lower temperature limit, which may occur in a cold ambient environment. In such an event the controller 30 would activate the electric resistance heater 48 to heat air circulated over the electric resistance heater by the fan(s) 44 associated with the refrigerant heat absorption heat exchanger.

The plurality of power demand loads may be alternating current loads (AC loads) and/or direct current loads (DC loads). For example, in an embodiment of the transport refrigerant unit 22, both fan motors 42, 46 may be alternating current (AC) motors. In another embodiment of the transport refrigeration unit, both fan motors 42, 46 may be direct current (DC) motors. In another embodiment, one of the fan motors 42, 46 may be an AC motor and the other a DC motor. Therefore, the power supply system disclosed herein may further include a direct current (DC) alternator 50 belt driven off the engine 26 as illustrated schematically in FIG. 1. It is to be understood that "belt driven" as used herein includes not only belt drives, but also chain drives, band drives and the like.

When the engine 26 is operating, the AC generator 24, being directly driven by the engine 26, generates alternating current power (AC power) that may be used to power AC loads of the refrigerant unit 22 and the DC alternator 50, being belt driven by the engine 26, generates direct current power (DC power) that may be used to power DC loads. To provide a source of power when the engine 26 is not operating, such during a period when the control temperature within the refrigerated cargo space is stable and within the specified product temperature range and the compression device 32 is not in operation, a period commonly referred to a standstill, temperature conditions, the power supply system may include a battery pack 28.

Various exemplary embodiments of the power supply system associated with the transport refrigeration system 20 are depicted schematically in FIGS. 3-6. In the embodiments depicted in FIGS. 3 and 4, the battery pack 28 comprises a low voltage battery pack. In the embodiments depicted in FIGS. 5 and 6, the battery pack 28 includes both a low voltage battery pack 28HV and also includes a high voltage battery pack 28LV. The low voltage battery pack 28LV may be used to power electronic equipment, such as the system controller 30 and other control system components, as well as lighting associated with the transport refrigeration system. The high voltage battery pack 28HV may be used for storing direct current (DC) power and for providing a second source of direct current (DC) power to supplement the direct current power produced by the alternator 50 for powering one or more of the refrigerant unit power loads. A high voltage battery pack charger 70 may be provided and electrically coupled to the electric generator 24 and configured to charge the high voltage battery pack 28HV. However, as will be discussed further hereinafter, a low voltage battery pack may also be used, particularly if no high voltage battery pack is included, during standstill periods to selectively power one or more refrigeration unit power loads. Optionally, the power supply system may include a connection (not shown) adapted to connect to an electric power grid for supplying grid electric power to the transport refrigeration unit 22 during periods when the truck, trailer or container is parked, for example at an overnight truck stop or at a warehouse.

Referring to FIGS. 3-6, in particular, the power supply system may further include a power distribution system 60 arranged to receive AC power generated by the generator 24, to receive DC power generated by the alternator 50, and to receive DC power drawn from the battery pack 28. The power distribution system 60 is configured to selectively distribute electric power to the plurality of refrigeration unit electric loads, including at least the fan motors 42, 46. The power distribution system 60 may include both an AC power distribution bus 62 and a DC power distribution bus 64. The power supply system may further include various power converters, such as AC to DC converters to convert alternating current power distributed through the AC distribution bus 62 into direct current power, and DC to AC inverters to convert direct current power distributed through the DC distribution bus 64 into alternating current power. The power supply system may also include other power modifiers such as, but not limited to, AC to AC voltage/frequency converters, and DC to DC voltage converters, as appropriate.

The controller 30 may selectively distribute electric power through the power distribution system 60 to each of the refrigeration unit power loads in the form of AC power through the AC distribution bus 62 and DC power through the DC distribution bus 64. For example, in the FIG. 3 embodiment, the fan motors 42, 46 are both AC motor. Alternating current power is supplied to power distribution system 60 from the electric generator 24 and direct current power is supplied to the power distribution system 60 from both the DC alternator 50 and the low voltage battery pack 28LV. The power supply system is configured to provide alternating current power to a plurality of refrigeration unit AC power loads 72, including the AC fan motors 42, 46. In this embodiment, the plurality of refrigerant unit AC power loads 72 may be electrically connected directly to the AC power bus 62 and also connected through a DC to AC power converter 74 to the DC power bus 64 of the power distribution system 60.

Figure 4:
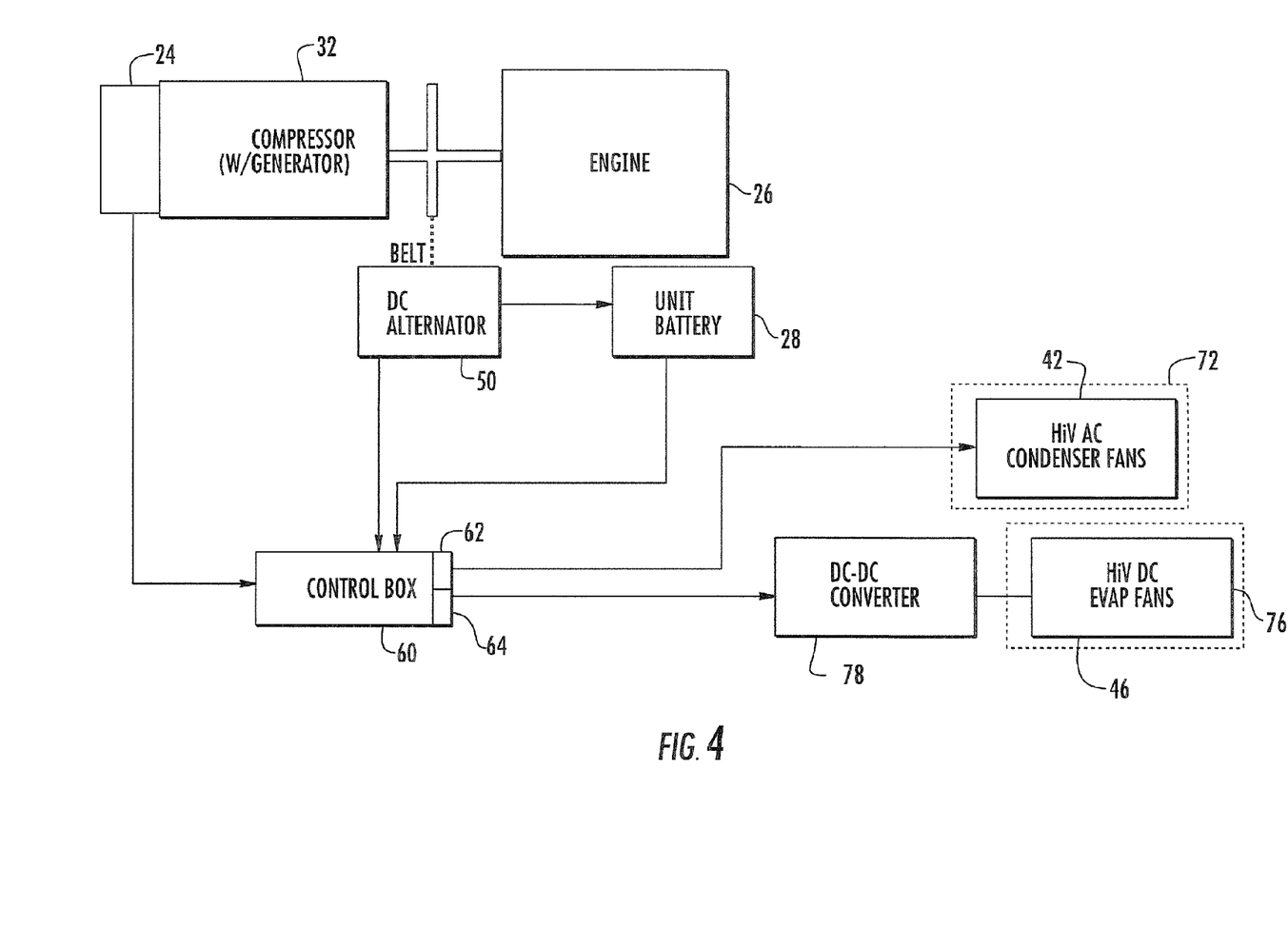
FIG. 4 is a schematic representation of another exemplary embodiment of a power supply system as disclosed herein.

In the embodiment depicted in FIG. 4, the fan motor(s) 42 is a high voltage AC fan motor(s) and the fan motor(s) 46 is a high voltage DC fan motor(s). Again, alternating current power is supplied to power distribution system 60 from the electric generator 24 and direct current power is supplied to the power distribution system 60 form both the DC alternator 50 and the low voltage battery pack 28. However, the power supply system is configured to not only deliver AC power through the AC distribution bus 62 to a plurality of refrigeration unit AC power loads 72, including the AC fan motor(s) 42, but also deliver DC power through the DC distribution bus 64 to a plurality of refrigeration unit DC power loads 76, including the DC fan motor(s) 46. In this embodiment, the refrigeration unit AC power loads 72 may be electrically connected directly to the AC distribution bus 62 and the refrigeration unit DC power loads 76 may be electrically connected directly to the DC distribution bus 64. Additionally, a DC to DC converter may be included in the circuit between the DC fan motor(s) 46 and the DC power distribution bus 64 for boosting the voltage of the DC power as necessary.

Figure 5:
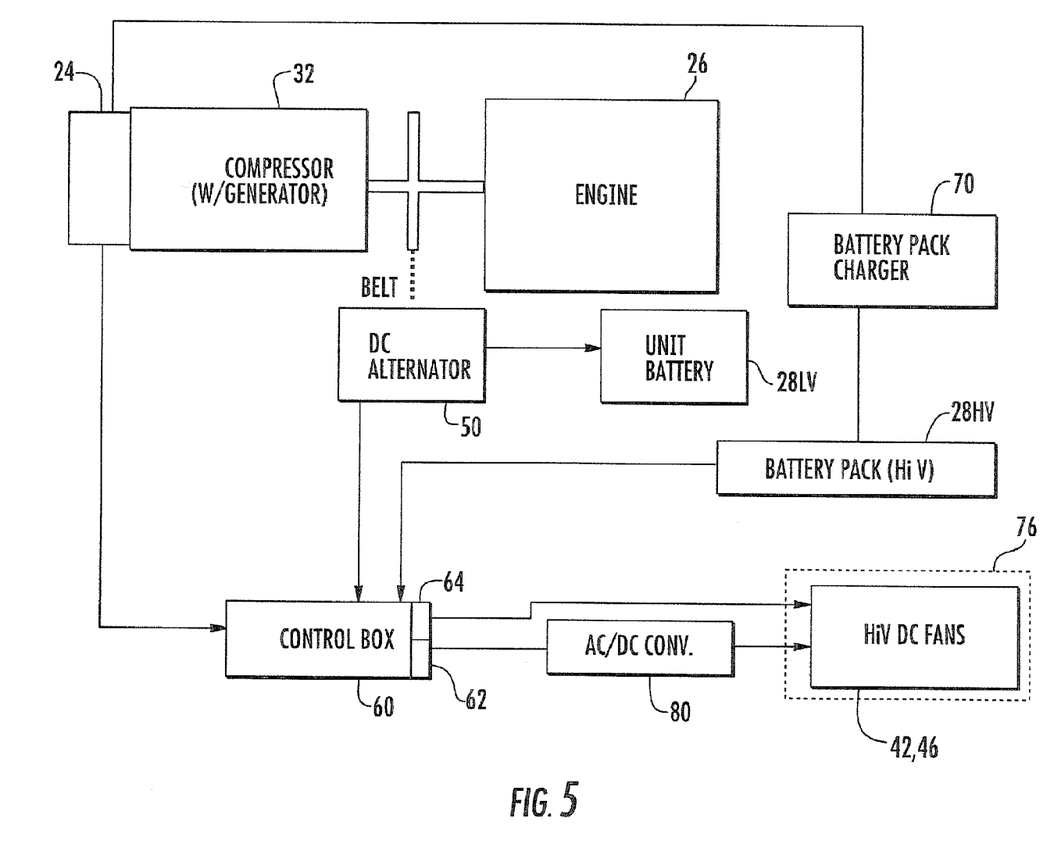
FIG. 5 is a schematic representation of still another exemplary embodiment of a power supply system as disclosed herein.
Figure 6:
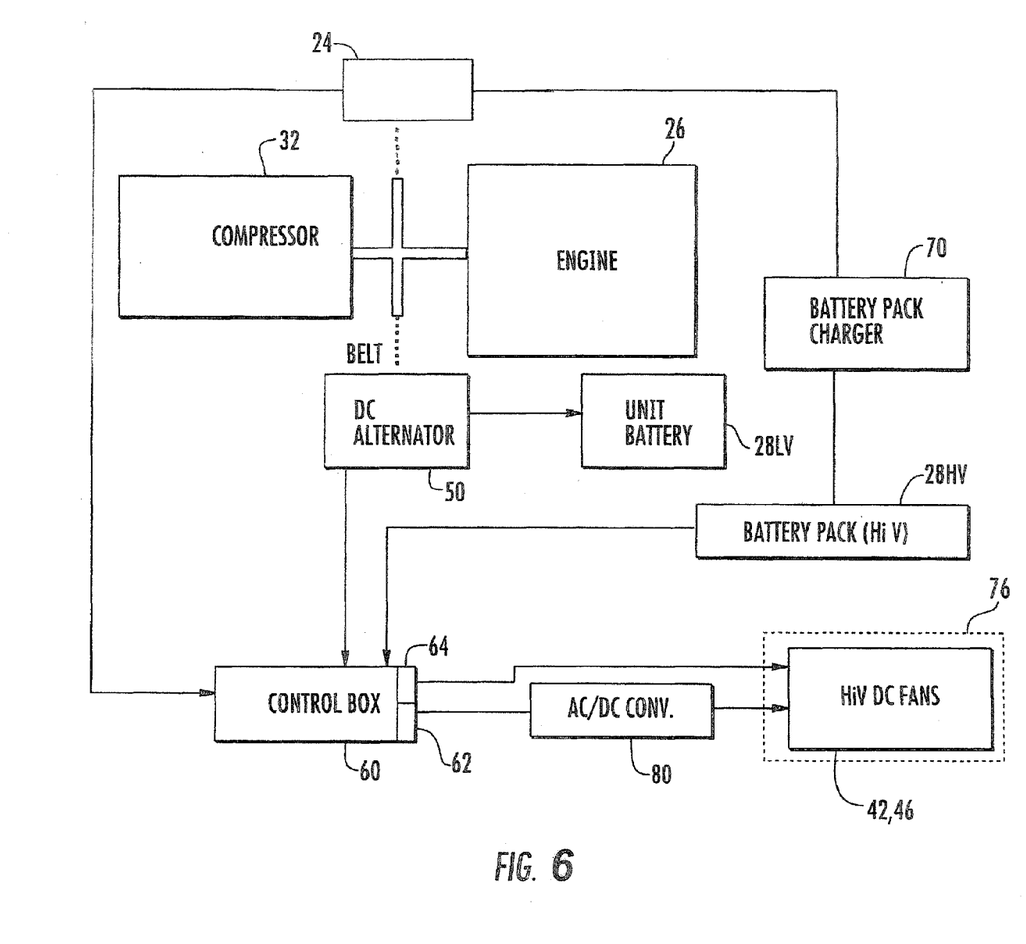
FIG. 6 is a schematic representation of an alternate embodiment of the power supply system illustrated in FIG. 5.

In the embodiments depicted in FIGS. 5 and 6, the fan motor(s) 42 and the fan motor(s) 46 are high voltage DC fan motors. Again, alternating current power is supplied to power distribution system 60 from the electric generator 24. Direct power is supplied to the power distribution system 60 from both the DC alternator 50 and the high voltage battery pack 28HV. The power supply system is configured to deliver direct current power to a plurality of refrigeration unit DC power loads 76, including the high voltage DC fan motors 42, 46. In this embodiment, the plurality of refrigeration unit DC power loads may be electrically connected directly to the DC power distribution bus 64 and may also be electrically connected through an AC to DC converter 80 to the AC power distribution bus 62.

Figure 3:
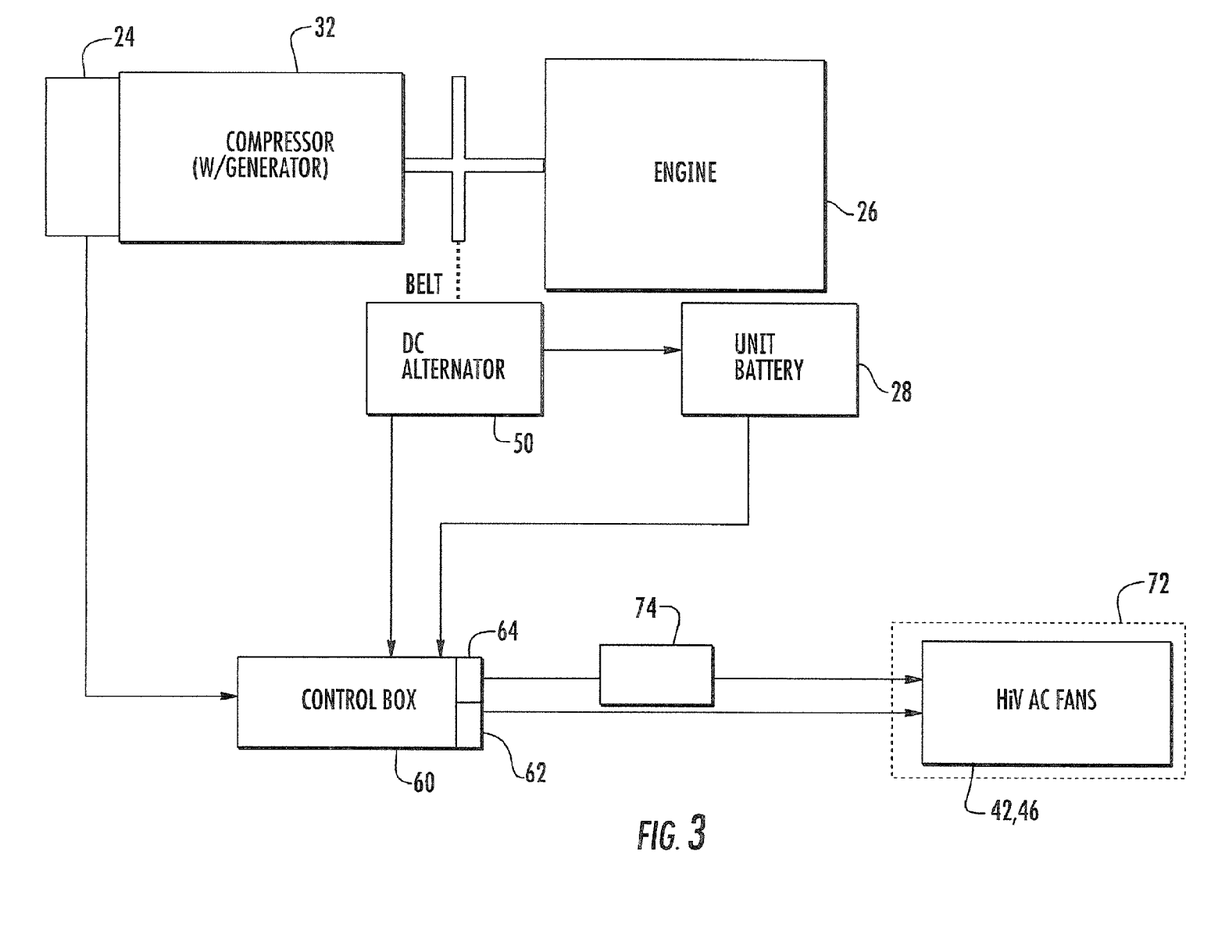
FIG. 3 is a schematic representation of an exemplary embodiment of a power supply system as disclosed herein.

In the embodiment of the power supply system depicted in FIG. 5, the electric generator 24 is directly coupled to the shaft of the engine 26 to be directly driven by the engine 26. The embodiment of the power supply system depicted in FIG. 6 is identical to the embodiment of the power supply system depicted in FIG. 5 with the exception that the electric generator 24 is belt driven, that is coupled to the drive shaft of the engine 26 through a belt drive arrangement. In either dive arrangement, the electric generator 24 is coupled to the engine 26 for driving the electric generator 24 for generating alternating current (AC) power. Although the electric generator 24 in the embodiments of the power supply system depicted in FIGS. 3 and 4 is directly driven by the engine 26, it is to be understood that the electric generator 24 could alternatively be belt driven through a belt drive arrangement such as illustrated schematically in FIG. 6. As noted previously with respect to the alternator 50, "belt driven" includes not only belt drives, but also chain drives, band drives and the like.

Figure 2:
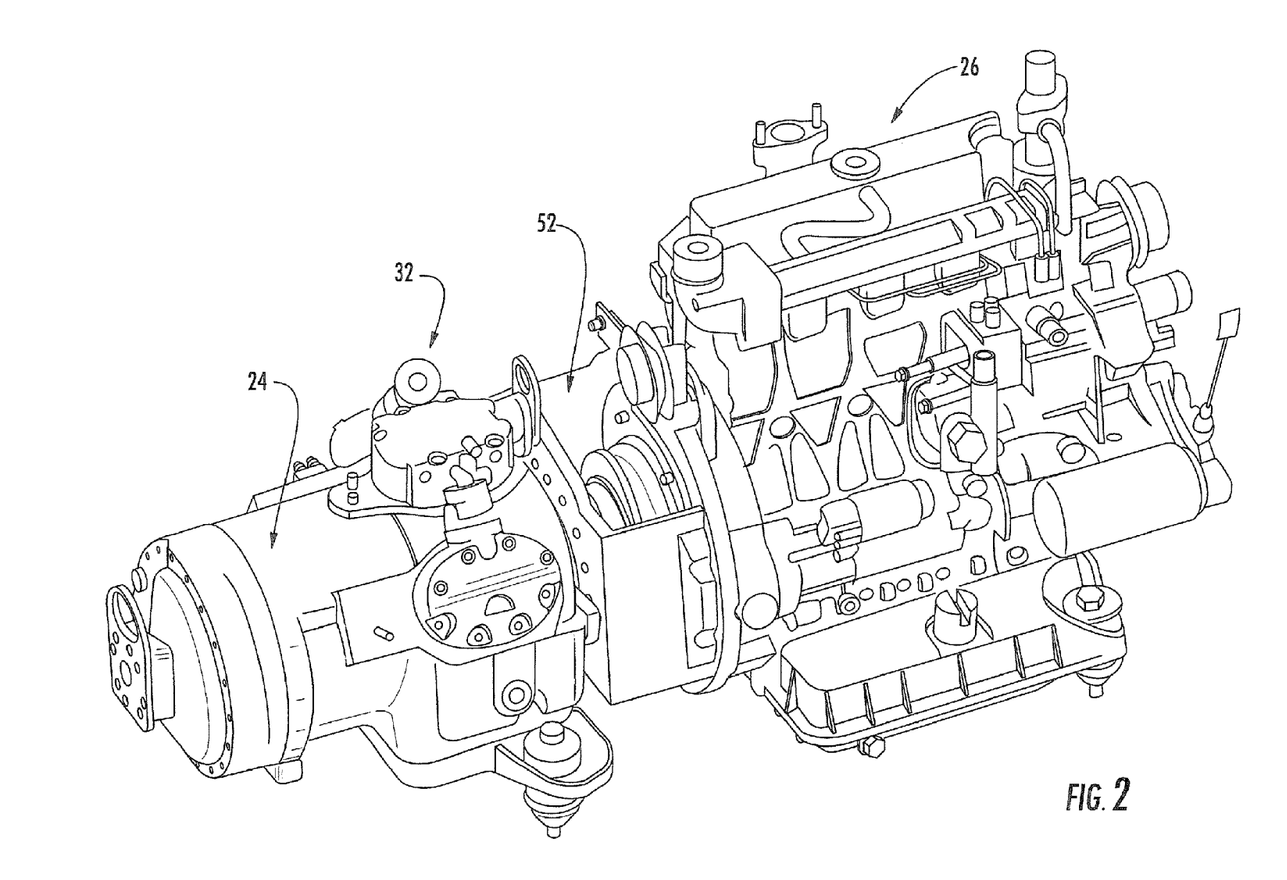
FIG. 2 is a perspective view of an embodiment of an assembly of a compressor with an integrated generator mounted to an engine in a direct drive relationship.

A method is disclosed for operating a transport refrigeration system 20 having a refrigeration unit 22 having a compressor 32, a condenser/gas cooler fan 40 and an evaporator fan 44. Referring to the embodiment of the power supply system depicted in FIG. 3, the disclosed method in this embodiment includes the steps of: providing an engine 26 and coupling the engine 26 to the compressor 32 for directly driving the compressor 32; providing a generator 24 and coupling the generator 24 to the engine 26 for driving the generator 24 for generating alternating current power; providing alternating current motors 42,46 for driving the condenser/gas cooler fan 40 and the evaporator fan 44; and powering the alternating current motors with alternating current generated by the generator. The method may further include the step of integrating the generator 24 into the compressor 32, for example as depicted in FIG. 2.

Referring to the embodiments of the power supply system depicted in FIGS. 5 and 6, the disclosed method in this embodiment includes the steps of: providing an engine 26 and coupling the engine 26 to the compressor 32 for directly driving the compressor 32; providing a generator 24 and coupling the generator 24 to the engine 26 for driving the generator 24 for generating alternating current power; providing a high voltage battery pack 28HV for storing and supplying direct current power; providing direct current motors 42, 46 for driving the condenser/gas cooler fan and the evaporator fan; and during a temperature pull down mode, operating the engine 26 to drive the compressor 32, switching off the generator 24 and powering the direct current motors 42, 46 with direct current supplied by the high voltage battery pack 28HV.

The disclosed method may also include the further steps of during a temperature control mode: switching on the generator 24; operating the engine 26 to drive the compressor 32 and the generator 24; converting alternating current power generated by the generator 24 to direct current power; and powering the direct current motors 42, 46 with the converted power. The method may include the further step of charging the high voltage battery pack 28HV using alternating power generated by the generator 24

The disclosed method may include the further steps of during a standstill mode: shutting down the engine 26; and operating the evaporator fan 44 at selected intervals for selected time periods using direct current power supplied by the high voltage battery pack 28HV. The disclosed method may include the further steps of: providing a low voltage battery pack; and during a standstill mode, shutting down the engine 26 and operating the evaporator fan 44 at selected intervals for selected time periods using direct current power supplied by the low voltage battery pack. In this mode, the method may include the further step of boosting the voltage of the direct current supplied by the low voltage battery pack as necessary to power the evaporator fan 44 during periods of operation during the standstill mode.

Providing DC fan motors for driving the fans 40, 44 and providing a high voltage battery pack 28HV and operating the transport refrigeration system 22 during peak load demand with the engine 26 coupled to the compressor for directly driving the compressor 32, while switching off the generator 24 and powering the fan motors 42, 46 with direct current power drawn from the high voltage battery pack 28HV permits downsizing of the engine 26. For example, providing a 3 kilowatt high voltage battery pack for powering the fan motors 42, 46 associated with the condenser/gas cooler fan(s) 40 and evaporator fan(s) 44, respectively, during peak load demand, e.g. during operation of the refrigeration unit in a temperature pull down mode, permits the engine to be downsized from a typical 16 kilowatt output engine to a smaller 13 kilowatt output engine. Use of a smaller output engine results in lower weight and lower fuel consumption. Despite the downsizing of the engine 26, the engine 26 will still have ample excess output capacity during lower load demand modes, e.g. during operation of the refrigeration unit in the temperature control mode, to recharge the high voltage battery pack 28HV using power provided through the generator 24 driven by the engine 26.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. A mobile refrigerated system for transport of perishable cargo, the mobile refrigerated system comprising:
    a refrigeration unit having a compressor and a plurality of refrigeration unit electric loads;
    a power supply system including a single engine coupled to the compressor for direct drive powering the compressor, and a generator arranged to be driven by the engine for generating electric power;
    wherein the power supply system further comprises an alternator arranged to be belt driven by the engine for generating electric power;
    a power distribution system arranged to receive electric power generated by the generator and by the alternator and configured to selectively distribute electric power to the plurality of refrigeration unit electric loads;
    wherein the generator generates alternating current power and the alternator generates direct current power and the power distribution system is configured to distribute alternating current power to at least one of the plurality of refrigeration unit electric loads and to distribute direct current power to at least one of the plurality of refrigeration unit electric loads;
    wherein the power supply system further comprises a battery pack for storing electric power and providing a second source of direct current power;
    wherein the plurality of refrigeration unit loads includes at least one direct current powered fan motor, powered, the power distribution system selectively powering the direct current fan motor by selecting at least one of direct current generated by the alternator, direct current from the battery pack, and direct current derived from converting alternating current generated by the generator.

2. The system as recited in claim 1, the generator and the compressor being mounted to a common drive shaft driven by the engine.

3. The system as recited in claim 2 wherein the generator is integrated with the compressor.

4. The system as recited in claim 1 wherein the generator is belt driven by the engine.

5. The system as recited in claim 1 further comprising a battery pack charger electrically coupled to the generator and configured to charge the battery pack.

6. The system as recited in claim 1 wherein the plurality of refrigeration unit loads includes at least one alternating current fan motor powered by alternating current generated by the generator.

7. The system as recited in claim 1 wherein the refrigeration unit is operatively associated with a cargo box of one of a truck, a trailer and an intermodal container for controlling a temperature within the cargo box.

8. A method for operating a transport refrigeration system having a refrigeration unit having a compressor, a condenser fan and an evaporator fan, the method comprising:
    providing an engine and coupling the engine to the compressor for driving the compressor;
    providing a generator and coupling the generator to the engine for directly driving the generator for generating alternating current power;
    providing a battery pack for storing and supplying direct current power;
    providing direct current motors for driving the condenser fan and the evaporator fan;
    during a temperature pull down mode, operating the engine to drive the compressor, and
    during the temperature pull down mode, switching off the generator and powering the direct current motors with direct current supplied by the battery pack.

9. The method as recited in claim 8 further comprising during a temperature control mode:
    switching on the generator;
    operating the engine to drive the compressor and the generator;
    converting alternating current power generated by the generator to direct current power; and
    powering the direct current motors with the converted power.

10. The method as recited in claim 9 further comprising charging the battery pack using alternating power generated by the generator.

11. The method as recited in claim 8 further comprising during a standstill mode:
    shutting down the engine; and
    operating the evaporator fan at selected intervals for selected time periods using direct current power supplied by the battery pack.

12. A method for operating a transport refrigeration system having a refrigeration unit having a compressor, a condenser fan and an evaporator fan, the method comprising:
    providing an engine and coupling the engine to the compressor for driving the compressor;
    providing a generator and coupling the generator to the engine for directly driving the generator for generating alternating current power;

providing a battery pack for storing and supplying direct current power;

providing direct current motors for driving the condenser fan and the evaporator fan;

during a temperature pull down mode, operating the engine to drive the compressor switching off the generator and powering the direct current motors with direct current supplied by the battery pack;

during a temperature control mode switching on the generator, operating the engine to drive the compressor and the generator, converting alternating current power generated by the generator to direct current power and powering the direct current motors with the converted power;

during a standstill mode shutting down the engine and operating the evaporator fan at selected intervals for selected time periods using direct current power supplied by the battery pack.

* * * * *